June 22, 1937.  J. BIJUR  2,084,315
FLUID DISTRIBUTION AND REGULATION
Filed Aug. 20, 1929   2 Sheets-Sheet 1
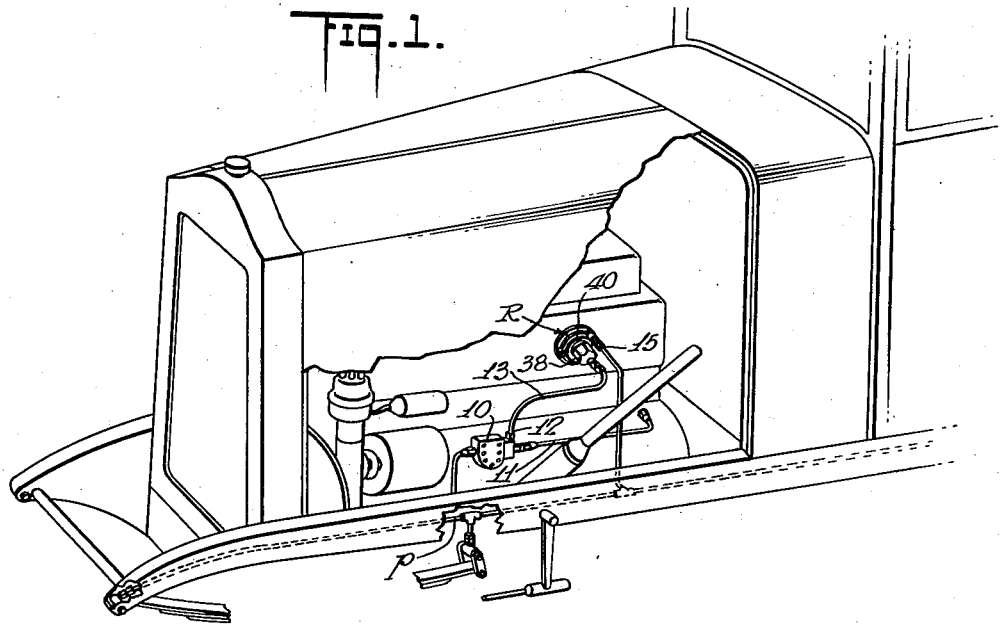
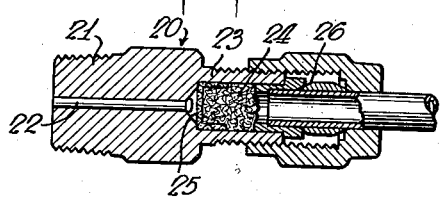
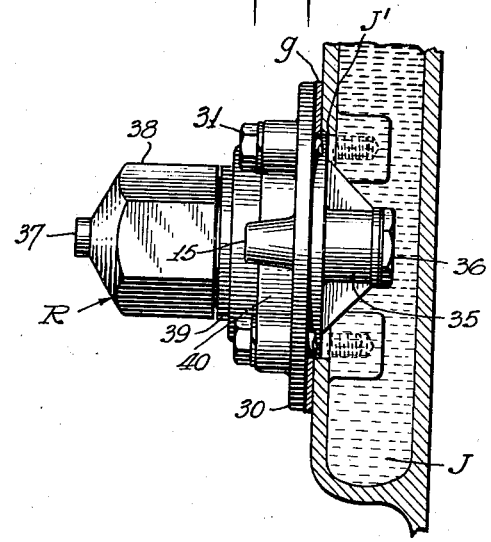
INVENTOR
*Joseph Bijur*
BY
*Dean, Fairbank, Obright & Hirsch.*
his ATTORNEYS.

June 22, 1937.                    J. BIJUR                    2,084,315
                      FLUID DISTRIBUTION AND REGULATION
                    Filed Aug. 20, 1929         2 Sheets-Sheet 2
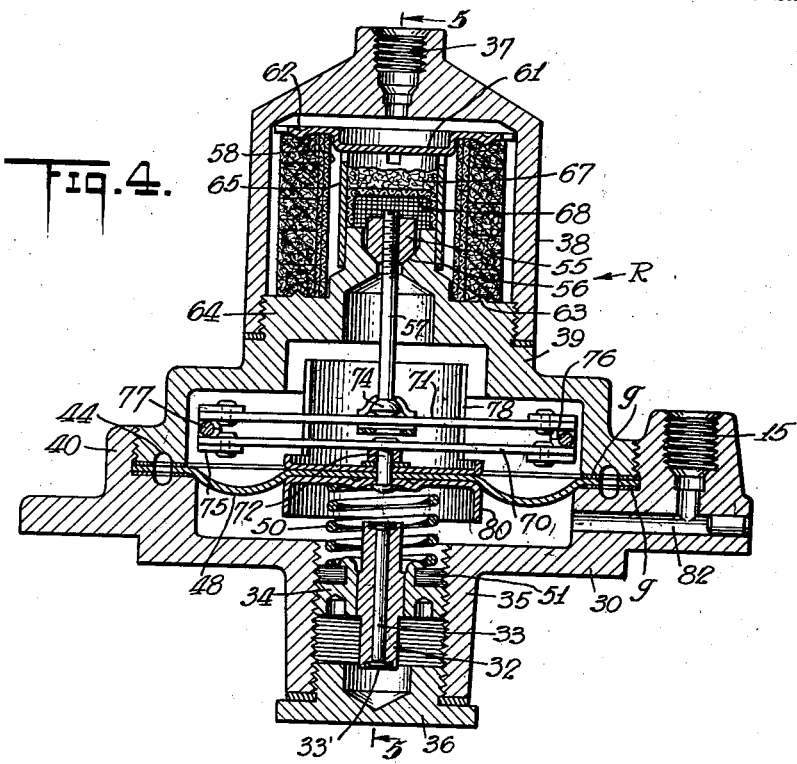
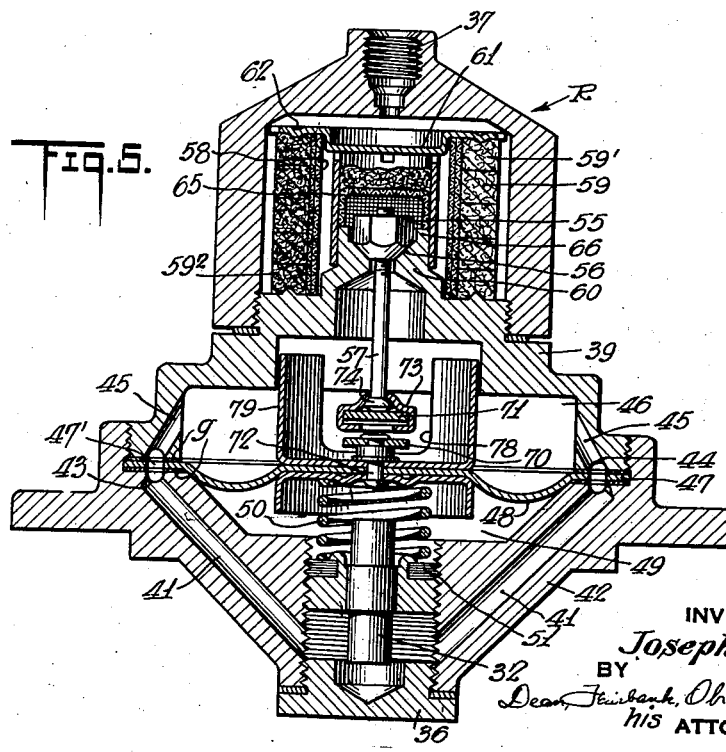
INVENTOR
Joseph Bijur.
BY
his ATTORNEYS.

Patented June 22, 1937

2,084,315

UNITED STATES PATENT OFFICE 2,084,315

FLUID DISTRIBUTION AND REGULATION

Joseph Bijur, New York, N. Y., assignor to Auto Research Corporation, a corporation of Delaware Application August 20, 1929, Serial No. 387,130

19 Claims. (Cl. 184—7)

My present invention is shown embodied in a central lubricating system although the principle of the invention is applicable to the distribution of other fluids for other purposes.

It is an object of the invention to provide an automatic fluid feed system which shall be self-compensating to assure correct feed in accordance with predetermined more or less constant requirements under widely varying operating conditions.

Another object is to provide a pressure system, the self-compensating action of which is attained through the pressure source at the inlet of the system and the distributing outlets be of entirely conventional construction, incapable in themselves of such compensation.

Another object is to provide a simple regulator unit for a system of the above type having an automatic and inherent action to accomplish the flow compensation required.

Another object is to accomplish more particularly for a central lubricating system subject to varying temperatures of use during operation, compensation in lubricant feed for the great increase in viscosity with falling temperature.

In a specific application of the invention to feed of lubricant from the engine oil pump, to the chassis bearings of an automobile, the difficulty arises that while the viscosity of the hot engine oil coursing through the engine bearings varies but little during the limits of summer and winter use, that in the chassis lines may be 50 times as viscous in cold weather as in hot. Consequently the engine oil pump which is regulated to maintain relatively uniform pressure would feed far too little oil to the chassis in winter, assuming it to feed correctly in summer.

A particular object, accordingly, is to provide a chassis lubricating system capable of utilizing the ordinary engine oil normally in circulation in the engine of an automobile and the ordinary engine oil pump to feed the chassis distributing system, obviating, on the one hand, the great reduction in lubricant feed to the chassis bearings with fall in temperature, or on the other hand, any substantial loss of oil under the reduced viscosity with increase of temperature and which, moreover, inherently prevents the draining of the engine crankcase should a break develop in the chassis line.

Another object is to provide a system of the above type in which continuous slow flow of lubricant to the chassis bearings may be accomplished with the use of drip plug or regulator outlets of construction far coarser than would be required to establish correct rates of flow when applying the full pressure evolved at the engine pump to the distributing pipe system.

Another object is to provide a system of the above type absolutely automatic in action, requiring no attention of any kind as long as the engine remains in operative condition, to assure reliable lubrication of the chassis system.

Another object is to provide a system of the above type, the correct feed of which is in nowise dependent on constancy of pressure or output of the lubricant pump of a variable speed lubricated mechanism.

The invention is embodied in a fluid distributing system of the character involving a feed line or a branched distributing system having restricted flow proportioning means in the outlet branches thereof, and supplied under pressure from a fluid propelling unit or pump which may be subject to varying conditions of use. Generically the invention involves in a system of the above type the use of an automatic regulator preferably a unit in itself an article of manufacture designed to compensate for widely varying conditions of use in order to assure throughout use a substantially continuous uniform rate of feed into the distributing system.

In a preferred embodiment, the regulator unit is arranged to respond to incipient changes in rate of flow through the distributing system, resulting, for instance, from changes in the viscosity of oil therein, automatically to set or determine the magnitude of pressure from the source, required to maintain substantial constancy of feed.

The regulator unit may include a pressure regulator automatically varied in accordance with the rate of flow through the distributing system, to set or determine the pressure applied to a rate controlling flow resistance element in series with the distributing line.

In a preferred embodiment, the pressure at the source is of magnitude larger than ever utilized in the distributing system and the pressure regulator determines the proportion of the pressure effectively applied to the rate control resistance element to bring about the constancy of feed rate.

The variable pressure regulator is preferably in the form of a resistant valve interconnected with a movable balancing device accommodating to prevent change in the rate of flow through the rate control resistance in series with the distributing system. The balancing device may include a diaphragm to one face of which the pressure from the pump is applied and the rate controlling flow resistance passes the lubricant to the distributing line, the head of which is in direct communication with the other face of the diaphragm. A coil spring reacting against the diaphragm balances or determines the position of the valve, which in part controls the desired loss in pressure potential through said controlling resistance.

The rate controlling flow resistance is preferably so constructed and arranged that the flow rate therethrough remains approximately constant under all operating conditions.

This result may be accomplished by maintaining the balancing spring under approximately uniform compression, and the flow rate control resistance at approximately uniform temperature, as, for instance, by disposing it at the water jacket of the engine. The effect of variations in the temperature of the water jacket with consequent variations in the flow through the rate control resistance under the relatively uniform difference of pressure thereacross, may be compensated for by auxiliary means automatic in action. This may comprise a thermostat in the unit adjacent the water jacket, which at the relatively low temperature under the engine hood in cold weather, automatically moves the variable pressure regulator to wide open position, so that the effective pressure to the diaphragm increases. The consequent movement of the diaphragm to restore equilibrium naturally compresses the balancing spring with consequent increase in the drop of pressure across the rate control element, thus counteracting the reduction in rate of lubricant feed which would otherwise occur.

In the accompanying drawings in which is shown one of various possible embodiments of the several features of the invention, Fig. 1 is a fragmentary diagrammatic view of a chassis lubricating system embodying my installation, Fig. 2 is a view in longitudinal cross-section illustrating one of various possible constructions of flow rate proportioning drip plugs, Fig. 3 is a view partly in section and on a larger scale illustrating the mounting of the regulator unit, Fig. 4 is a view in longitudinal cross-section through the regulator unit, and Fig. 5 is a transverse section taken on line 5—5 of Fig. 4.

Referring now to the drawings there is shown in Fig. 1, a general layout of automobile chassis indicating in diagrammatic view the conventional oil pump 10 of a pressure engine oil lubricating system feeding through conduit 11 to the various engine bearings. In parallel with the outlet to the engine bearings, the engine oil pump has another outlet 12 from which the chassis lubricating system derives its lubricant. This outlet leads through a pipe 13 to a regulator unit R the construction of which will be more fully described hereinafter. The unit R has an outlet 15 leading to the chassis distributing system. The latter includes one or more main pipes p leading generally along structural parts of the vehicle and provided with a multiplicity of outlet branches in parallel, leading to various chassis bearings. The outlet branches have flow proportioning resistances which may be in the character of drip plug fittings applied at the various bearings. These drip plugs are preferably of character adapted to feed under very low pressure and accordingly devoid of spring seated valves.

In the illustrative embodiment shown, each drip plug embodies a fitting 20 having a shank 21 for application to a bearing and provided with an accurately dimensioned longitudinal bore nearly filled with a pin 22 the diameter of which determines the rate of feed at any given pressure, with oil of a given viscosity. At the inlet of the fitting is a socket 23 which may be nearly filled with a plug 24 of wool felt backed by a cup 25 of fine mesh metal screen and adapted to intercept any solid particles carried with the oil. A compression coupling 26 affixes the outlet branch of the feed pipe to the fitting. The various fittings will have diverse feed rates, each appropriate to the requirements of the bearing supplied therefrom and determined by the diameter of pin inserted therein.

With the system thus far described, assuming the effective pressure of the oil pump to be such as to cause approximately correct feed of the oil through the drip plugs at a given temperature in summer, it will be apparent, that due to the tremendous rise in viscosity of the oil in winter, say to fifty times its value in summer, the pump would feed only a small percentage of the requirements to the bearings in winter which would at that time be so greatly under-lubricated as to be substantially unlubricated.

The ordinary engine oil pump is inherently unsuitable, properly to lubricate the chassis under the widely varying temperature conditions thereat, especially so, since at the same time it must perform its primary function of engine lubrication. By means of my regulator, the engine oil pump is completely adapted for proper feed of the chassis, while engine lubrication is in no respect interfered with.

The regulator as shown in Figs. 4 and 5 embodies preferably a casing structure including a flanged base piece 30 affixed as at 31 to a part where the temperature during operation is not subject to wide variation.

In the chassis lubricating embodiment, the flange piece 30 may be affixed against the water jacket J of the engine, a gasket g maintaining a leak-proof joint. The jacket is perforated at J' to accommodate the protruding socket 35 of the regulator.

The regulator includes preferably a flow rate controlling restriction device which may comprise a cartridge 32 having a restricted passage longitudinally thereof, illustratively a pin 33 fitting with little clearance in a longitudinal bore in which it is maintained in place by serrated washers 33'. This cartridge is pressed into a nut 34 threaded into the axial socket 35 of the base 30, the lower end of which is sealed by means of a closure plug 36. The unit R has an inlet 37 preferably at the top or outer end of a hood piece 38 threaded upon a shoulder piece 39 which, in turn, is threaded into an upstanding flange 40 in the flange base piece 30. The rim 47 of a cupped diaphragm 43 is clamped between the flanged base piece 30 and the shoulder piece 39, gaskets g at opposite faces of the diaphragm rim rendering the connection oil-tight. Lubricant is fed to the inlet or lower end of cartridge 32 from cavity 46 of the shoulder piece, by way of oblique bores 45 delivering to an annular groove 44 in the shoulder piece, registering with a corresponding annular groove 43 in the base piece, the intervening diaphragm rim 47 and the gaskets g having a series of communicating holes 47'. The oil reaches the cartridge 32 by way of one or more oblique bores 41 in the hub ribs 42 of the base casting. The cartridge feeds to the cavity 49 in the base piece 30 and thence by way of bore 82 and outlet 15 to the distributing system. By reason of the pressure loss in forcing oil through cartridge 32, the oil pressure in cavity 49 is less during operation than that in cavity 46. This loss in pressure across the flow resistance device 32 is determined by a valve 55, which is held in a balanced position by a diaphragm 48, which in turn is balanced by coil spring 50 encircling the inner part of the cartridge 32 and re-acting against packing 51 on the inner face of the nut 34.

The effective pressure applied to the control resistance 32 is governed by the position of the diaphragm 48, through a variable pressure control resistance device, which in the present embodiment comprises a flow resistant conical valve 55 coacting with a corresponding conical seat 56 in the outer part of the shoulder piece 39, and threaded upon the outer end of a shank 57 longitudinally of the unit and under control of the diaphragm.

The feed into the regulator unit is protected, to prevent derangement or clogging by the interception of any solid particles. For this purpose, there is illustratively shown a filter unit comprising a wire mesh cylinder 58 surrounded by a series of superposed wool felt filter disks 59. The filter unit is telescoped over the reduced end 60 of shoulder piece 39 and is maintained assembled by means of a cap piece 61, the edge of which is pressed by the roof of the hood piece 38 to urge an annular ridge 62 of said cap piece against the outer felt ring 59' and to urge the innermost felt ring 59² into snug engagement with the upstanding annular ridge 63 on the outer shoulder 64 of the shoulder piece 39.

Preferably the variable resistance regulator is protected during handling by a cylinder piece 65, telescoped over the reduced neck 66 of the shoulder piece and mounting a felt disk 67 backed by a wire mesh cup 68 tightly fitted into the cylinder.

While not essential to operativeness, automatic means may be interposed between the diaphragm 48 and the variable pressure regulator, as a further refinement, to compensate for changes in the temperature of the regulator unit. This temperature compensator may comprise a pair of bi-metallic strips 70 and 71 roughly in parallel relation. Strip 70 is connected at its middle by a rivet 72 centrally of the diaphragm 48 and the strip 71 is similarly connected preferably by a connecting strap piece 73 having a central opening over the enlarged head 74 of the rod 57 and clenched about the middle of the upper strip 71. The two strips 70 and 71 are connected together at their opposite extremities by means of end pieces 75 riveted to the respective ends thereof and having overlapping ears 76 connected together by a cross pin 77 at each end. The thermostatic strip is retained against rotary displacement about the axis of the unit by lodging the same in notches 78 in a cup 79 against the upper face of the diaphragm 48, the lower face of which has a complementary cup 80, both cups affixed in place by a common rivet, preferably the same rivet 72 which connects thermostatic strip 70 with respect to the diaphragm 48.

Cups 79 and 80 prevent distortion of the central part of the diaphragm, which can move like a piston by virtue of the yield of the diaphragm material 48 therebeyond. The range of deflection of the diaphragm is limited by contact of the edges of cups 79 and 80 respectively with the shoulder piece 39 and the base piece 30.

When the system is on the vehicle or other mechanism and out of use, the coil spring 50 deflects the diaphragm 48, and moves the regulator valve 55 to open position. In use, pressure from the pump 10 forces oil readily through the filter 59 and through the cylinder 58 past the valve 55 and through the ducts 45 and 44 thence across the diaphragm 48 and through ducts 43 and 41 in the base plate into the lower end of the regulator resistance device 32 through which the oil proceeds into the cup part 49 of the base piece 30, whence it passes onward through bore 82 and outlet socket 15 into the distributing pipe system. The latter being normally filled with lubricant, due to the leak-inhibiting action of the drip plugs 26, the applied pressure will cause slow emission to the bearings.

In the absence of the flow rate control resistance 32, it is apparent that the pressure of the oil would be equal on opposite faces of the diaphragm and the latter would remain substantially undeflected in operation. Due to loss of pressure potential however, in forcing the oil through the flow rate control restriction 32, the applied pressure at the lower face of the diaphragm is, correspondingly, less than at the upper face. The coil compression spring 50 acts as a balancing element, and will be in equilibrium when the drop or loss of potential across the resistance element 32 is equal to its pressure.

The effective area of the diaphragm 48 is so many times greater than that of valve 55 that the position of the latter is practically determined by the diaphragm, substantially regardless of the fluid pressure exerted on the valve.

Assuming the valve stem 57 to be rigidly connected to the diaphragm 48 without any intervening thermostat, the range of deflection between practically closed position of the pressure regulator valve and open or low resistance position, is only a small fraction of an inch, such as $\tfrac{1}{32}''$ and the compression of the spring will not be substantially changed from one to the other extreme deflection of the diaphragm, so that the difference in pressure potential between the two ends of the rate control resistance does not vary materially.

The water jacket being cooler in winter than in summer, the oil through the regulator unit would thus become more viscous and under constant pressure potential across rate control 32, the rate of flow would, accordingly, be diminished.

The effect of change in the water jacket temperature is however more or less compensated for by the common practice of changing to a less viscous oil as the weather becomes colder.

Where the same grade of oil is used throughout the seasons, the thermostat 70—71 will perform a similar compensation for changes in temperature and therefore in viscosity of the oil in the regulator unit. The thermostat 70—71 is affected by the temperature in the water jacket, as well as by that of the atmosphere under the hood. Since the range of temperature variation under the hood between summer and winter is greater, though roughly proportional to that in the water jacket, the thermostat, arranged as described will operate more efficiently than if subject only to the relatively smaller range of temperature variation in the water jacket.

In cold weather, the thermostat 70—71 will have expanded sufficiently to move the valve 55 farther from the diaphragm. As a consequence, a greater differential pressure must be applied to the diaphragm which will cause the latter to be deflected until the valve 55 has been moved through such range as to re-establish the condition of equilibrium. The range of deflection of the diaphragm, in this instance, is determined by the expansion of the thermostat, which may be several times (five times or more) the range of diaphragm movement occurring in the absence of any thermostat. Under this greater deflection, the spring 50 is more greatly compressed, now determining an increased difference of potential or pressure drop across resistance 32. This increase in difference of potential counteracts the increase in viscosity of the oil through the rate control device.

It is not the entire area of a diaphragm, such as that at 48, which is effective to apply pressure for opposing spring 50. The upwardly sloping peripheral area thereof is taken up largely to transmit pressure against the clamping abutments for the diaphragm. As the diaphragm is deflected downwardly through the more substantial range imposed by the action of the thermostat, the width of the outer upwardly sloping peripheral area of diaphragm increases, a larger proportion of the total diaphragm area now transferring pressure to the clamping abutments, leaving a lesser diaphragm area effective to oppose spring pressure. The effective pressure applied to the diaphragm 48 being thus on a reduced effective area, the diaphragm becomes less efficient and a greater differential pressure would be required to move it against the spring 50 than when it is in the position shown in Figs. 4 and 5.

The decrease in efficiency of the diaphragm is cumulative in its effect with the increase in the strength of the spring 50, to compensate for the effect of change in temperature of the water jacket.

While as shown, both of these compensating agencies may be used conjointly, it will be understood that either may be used alone. The spring 50 as described, could be used with a diaphragm constructed and arranged to be of uniform effective area throughout the range of deflection thereof,—or the diaphragm, as described, could be used with a spring constructed and arranged to maintain a substantially constant force or strength throughout operation.

It will be readily understood that by appropriate design of the thermostat, partial or complete compensation and even over-compensation may be attained, for the effect of changing temperature in the water jacket.

The regulator unit is preferably mounted in position inverted with respect to that shown in Figs. 4 and 5 of the drawings. By such arrangement, any air in the regulator is caused to be expelled into and thence through the drip plugs out of the distributing line and the effect of the resiliency of any entrapped air would thus be eliminated.

While the regulator unit has been described as at the water jacket, it will be understood that it could be disposed at the crankcase, or other appropriate place, preferably where the temperature is higher than at the chassis. In other applications of the invention, the regulator would be disposed in analogous or more or less equivalent relations, or the temperature thereof could be maintained constant or otherwise controlled in manner apparent to those skilled in the art.

The filter element 59 is so constructed as to be readily removed and replaced, by removal of the hood 38. It is preferred, however, in addition to the filter unit to provide either a distinct filter for the engine sump, thereby to assure the feed of reasonably clean oil to the regulator, or to provide a separate settling chamber (not shown) in or near the crankcase, into which relatively clean oil from the crankcase is pumped and from the upper part of which oil is passed to the regulator at the extremely slow rate determined by the drip plug outlets, and the regulator itself.

Nut 34 may be adjusted in position to determine the initial setting of spring 50 in accordance with the requirements of the particular installation with which the regulator is to be used.

While the invention is shown specifically applied to the lubrication of an automobile chassis, it will be understood that it has similar utility in the lubrication of other mechanisms including stationary machinery, line shafting and factory installations generally. The system as disclosed will automatically compensate for variations in viscosity of the oil in the chassis lines whether due to varying temperature or to other causes, as well as for variations in the pressure applied to the oil, due to the varying speeds, for instance, of the oil pump driven from a variable speed mechanism.

Since the chassis bearings of many modern automobiles are nearly but not quite at uniform level, it may be desirable to provide valves in some or all of the drip plugs to check the small tendency to siphon from the higher parts through the lower drip plugs. These valves may be of the suction-seated type disclosed in my Patents Nos. 1,732,212 and 1,746,139. It is understood that the drop of pressure across rate control element 32 is such as to cause the application at the drip plugs of pressure even in the warmest weather, in the order of one-half pound, sufficient to assure delivery even under these conditions through those drip plugs that are at higher level.

It is seen that regardless of changes in the distributing system that would otherwise cause alterations in the rate of feed therethrough, the regulator unit maintains constancy of feed rate. The regulator operates to compensate automatically to maintain constancy of feed rate, wholly regardless what the agency tending to produce the change that is compensated for. The regulator compensates to maintain substantial constancy of feed rate, regardless whether the drip plugs be replaced by others of greater restriction or of lesser restriction or whether the temperature of the oil be changed, or other oils be substituted wholly regardless of the temperature coefficients thereof provided only they have approximately the same viscosity at the temperature of the water jacket.

The invention while it has a preferred application to central lubrication is thus seen to be of much wider scope and to be applicable in its broader aspects to self-compensation in a fluid feed system, and substantially regardless what the cause of variation in flow rate.

The present application is similar in subject matter to the co-pending application Serial Number 434,846, filed March 11, 1930, which discloses a device of the character of Figs. 4 and 5 of the present application without the fixed restriction 32, and in said co-pending application is covered the operation and construction of the device of Figs. 4 and 5 without said fixed restriction 32. The present application is also similar in subject matter to the co-pending application Serial Number 412,982 which has matured into Patent No. 2,040,076 issuing on May 12, 1936, which latter discloses a fixed master restriction, which is not variable by pressure or temperature responsive means, which last mentioned application also contains claims broadly directed to master restrictions of variable or invariable character. The co-pending application Serial Number 375,366, which has matured into Patent No. 2,009,430 on July 30, 1935, discloses a thermostatic device which is placed not in the direct line of flow from the source to the distributing system, but in a return passage from said distributing system to the source of lubricant supply.

It will thus be seen that there is herein described a device in which the several features of this invention are embodied, and which device in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:—

1. A branched fluid distributing system having flow controlling outlet devices subject during operation to wide variations in flow resistance, a pressure source feeding fluid into said system, and regulator means interposed between said pressure source and the branches of said system to minimize variations in flow rate under varying resistance conditions, said regulator means including a flow resisting valve and means responsive to the flow resistance imposed by the distributing system to determine the setting of said valve for flow resistance thereof in inverse ratio to that of said distributing system.

2. A branched fluid distributing system having flow controlling outlet devices subject during operation to wide variations in flow retarding effect, a pressure source feeding fluid into said system and regulator means including a flow retarding valve and displaceable means responsive to the flow retarding effect of the distributing system to determine the setting of said valve for resistance thereof in an inverse relation to that of said distributing system.

3. A branched fluid distributing system having flow controlling outlet devices subject during operation to wide variations in flow retarding effect, a pressure source feeding fluid into said system and regulator means including a flow retarding valve and a diaphragm responsive to the flow retarding effect of the distributing system to determine the setting of said valve for resistance thereof in inverse relation to that of said distributing system.

4. A fluid feed installation including a branched distributing system having highly resistant flow controlling outlets, means for injecting fluid into said system and having output differing from the requirements of the installation, regulator means comprising a diaphragm, a flow resistance device in series with said distributing system, having its inlet in communication with one face of said diaphragm and its outlet in communication with the other face thereof, and balancing means exerting a sustained pressure against the latter face of said diaphragm, said installation also including a variable restriction in series with said flow resistance device controlled by said diaphragm.

5. A fluid feed installation including a branched distributing system having highly resistant flow controlling outlets, means for injecting fluid into said system and having output differing from the requirements of the installation, a regulator including a diaphragm, subjected to pressure from said source, a fluid connection between the opposite faces of said diaphragm, a flow resistance device interposed in said connection and a spring exerting balancing pressure against one face of said diaphragm, said installation also including a variable restriction in series with said flow resistance device controlled by said diaphragm.

6. A central lubricating installation comprising a conduit system having flow resistant outlet branches, means for injecting lubricant under pressure into said system, an automatic regulator device interposed between said pressure source and the outlet branches to minimize the drop in the rate of lubricant feed due to rise of the oil viscosity in the cold, said regulator device including a variable flow resistance in series with the distributing system and means responding to the flow retarding effect of the flow resistance of said distributing system for automatically setting the position of said varying resistance for flow retarding effect in an inverse relation with respect to the resistance of the distributing system.

7. A central lubricating installation comprising a conduit system having flow resistant outlet branches, means for injecting lubricant under pressure into said system, an automatic regulator device interposed between said pressure source and the outlet branches to minimize the drop in the rate of lubricant feed due to increased flow resistance with rise of the oil viscosity in the cold; said regulator device including a flow resistant valve in series with the distributing system, and means responding to the flow retarding effect of the distributing system, automatically to actuate said valve to impose a resistance to flow, varying in an inverse relation with that imposed by the flow distributing system.

8. A centralized lubricating installation having a distributing system with highly resistant branched outlets, a pressure pump injecting lubricant into said system, automatic regulator means for maintaining approximate constancy of lubricant feed rate under great increase of flow resistance due to rise in oil viscosity with cold and under varying pressure exerted by the pump, said regulator means including a flow resistant valve, a spring normally urging said valve to open position, a diaphragm subject to pressure from the source delivered past said valve and against which said spring reacts, a duct about said diaphragm a flow resistance device at the outlet side of said diaphragm and supplied from said duct, said flow resistance device delivering to the distributing system.

9. A centralized lubricating installation comprising the combination of a distributing system having highly obstructed outlet branches determining flow division, a pressure pump injecting lubricant into said system, automatic regulator means interposed between said pump and the outlets of said system, said regulator means comprising a diaphragm, a resistance device having its inlet and outlet in direct communication with the opposite faces of the diaphragm creating a differential pressure, a coil spring urging said diaphragm against the differential pressure applying face thereof and a flow resistant valve interposed between said pump and said diaphragm and interconnected with said diaphragm to impose a resistance varying in an inverse ratio with the deflection of said diaphragm by said spring.

10. As an article of manufacture, a regulator unit for a fluid feed system, said unit comprising a casing having an inlet and an outlet, a diaphragm in said casing, a duct establishing communication from one face of said diaphragm to the other face thereof, a flow obstruction device in said duct, affording a relatively constant obstruction to flow, a variable flow obstruction in series with said flow obstruction device and connected to said diaphragm and resilient means to bias the diaphragm in one direction, said unit being constructed so that the diaphragm will be biased in the opposite direction by the pressure differential set up across said device when flow takes place from said inlet to said outlet.

11. As an article of manufacture, a regulator unit for a fluid feed system, said unit comprising a casing having an inlet and an outlet, a diaphragm in said casing, a duct establishing communication from one face of said diaphragm to the other face thereof, a flow obstruction device in said duct, a variable flow resistance device connected to said diaphragm and displaceable therewith and means acting on said diaphragm to displace the same.

12. As an article of manufacture, a regulator unit for a fluid feed system, said unit comprising a casing having an inlet and an outlet, a diaphragm in said casing, said casing having a duct establishing communication from one face of said diaphragm to the other face thereof, a flow obstruction device in said duct, a flow resistant valve having a stem connected to said diaphragm, and a coil spring urging said diaphragm toward valve opening position.

13. An automatic regulator unit for a liquid feed system, said unit comprising a casing having an inlet and an outlet, a diaphragm affixed at its rim in said casing, a flow resistance device delivering to said outlet, a coil spring about said device reacting against said diaphragm, a flow resistant valve connected to said diaphragm and having a cooperating seat in said casing, and a thermostat interposed between said diaphragm and said valve.

14. As an article of manufacture, a regulator unit for a fluid feed system, said unit comprising a casing having an inlet and an outlet, a diaphragm in said casing, said casing having a duct communicating from one face of said diaphragm to the other face thereof, a flow obstruction device transmitting the flow from said duct to said outlet, a valve in series with said device and resilient means biasing said diaphragm in a direction opposite to the direction in which it is biased by the pressure differential set up across said device when flow takes place from said inlet to said outlet.

15. A chassis lubricating system for a motor vehicle of the type including an internal combustion engine having a lubricant sump and an engine oil pump therein, said lubricating installation including a distributing system supplied from said oil pump and having highly resistant flow proportioning branches leading to the bearings, automatic regulator means for minimizing the wide variations in lubricant feed consequent upon the great changes in viscosity of oil in the chassis lines due to temperature variations, said regulator means including a flow resistance device throttling down the lubricant feed from said pump, said regulator having means actuated in response to decrease in flow rate due to rise in viscosity in the distributing system automatically to reduce the throttling effect of said regulator means.

16. A chassis lubricating system for a motor vehicle of the type including an internal combustion engine having a lubricant sump and an engine oil pump thereat, said lubricating installation including a distributing system supplied from said oil pump and having highly resistant flow proportioning branches leading to the bearings, automatic regulator means for minimizing the wide variations in lubricant feed consequent upon the great changes in viscosity of oil in the chassis lines due to temperature variations, said regulator including a diaphragm subject to pressure from said pump, a flow resistance device communicating at its inlet with one face of said diaphragm and at its outlet with the other face thereof and with the distributing line, means biasing said diaphragm in one direction and a variable resistance device in series with said first resistance device subject to the deflections of said diaphragm, to assure the application of sufficient pressure to said fixed resistance device to compel the desired drop of potential thereacross.

17. A centralized lubricating installation of type subject to wide variations of temperature in use, including a source of pressure, a distributing system connected thereto, regulating means interposed between the source and the distributing system to maintain substantial constancy of feed at various temperatures, said means comprising a flow rate control element in series with the distributing system, means coordinated with the distributing system and automatically governing the pressure required to maintain substantially constancy of flow rate, and means automatically compensating for variations in flow through the rate determining element, due to changes in the temperature of the lubricant passing therethrough.

18. A central lubricating installation comprising a distributing system subject to widely varying temperatures in use, a source of pressure feeding lubricant thereinto, regulator means interposed between said source and said distributing system and subject to temperature variation, said regulator means including a flow rate control device in series with the distributing system, means associated therewith determining the drop of pressure potential across said flow control device, and means responsive to the temperature of said regulator means for controlling the pressure determining means.

19. A central chassis lubricating installation comprising the combination of an engine oil pump, a chassis distributing system leading therefrom to various bearings and having highly restricted outlets, an automatic regulator interposed between the pump and the system and mounted at the water jacket of the engine, and serving to maintain substantial constancy of lubricant feed under various temperature conditions, said regulator including a flow rate control element in series with the distributing system, said element comprising balancing means determining the drop in pressure potential across the rate control element, said regulator having means to compensate in the flow rate due to changes in viscosity of the oil therein, said compensating means including a thermostat subject to the temperature of the atmosphere under the hood of the vehicle, a valve controlled thereby and serving to govern the application of pressure from the pump to the rate control element, to compensate for the effect of variations in the temperature of the oil through the regulator.

JOSEPH BIJUR.